United States Patent
Wong

(10) Patent No.: US 9,576,064 B2
(45) Date of Patent: Feb. 21, 2017

(54) THIRD PARTY PROGRAM INTEGRITY AND INTEGRATION CONTROL IN WEB-BASED APPLICATIONS

(75) Inventor: Daniel ManHung Wong, Palo Alto, CA (US)

(73) Assignee: Yahoo! Inc., Sunnyvale, CA (US)

(*) Notice: Subject to any disclaimer, the term of this patent is extended or adjusted under 35 U.S.C. 154(b) by 615 days.

(21) Appl. No.: 13/446,381

(22) Filed: Apr. 13, 2012

(65) Prior Publication Data

US 2013/0275590 A1  Oct. 17, 2013

(51) Int. Cl.
*G06F 15/16* (2006.01)
*G06F 17/30* (2006.01)
*H04L 29/08* (2006.01)
*H04L 29/06* (2006.01)
*G06F 21/62* (2013.01)

(52) U.S. Cl.
CPC ....... *G06F 17/3089* (2013.01); *G06F 21/6209* (2013.01); *H04L 29/06* (2013.01); *H04L 29/08072* (2013.01); *H04L 63/10* (2013.01); *G06F 2221/2115* (2013.01); *G06F 2221/2119* (2013.01)

(58) Field of Classification Search
CPC ............... H04L 29/06; H04L 29/08072; H04L 29/0809; H04L 29/08144; H04L 63/08; G06F 15/173
USPC ........ 709/225, 202, 205, 206, 207, 220, 227
See application file for complete search history.

(56) References Cited

U.S. PATENT DOCUMENTS

| | | | | |
|---|---|---|---|---|
| 6,470,450 | B1* | 10/2002 | Langford et al. | 713/182 |
| 7,017,162 | B2* | 3/2006 | Smith | G06F 9/465 719/315 |
| 7,069,271 | B1* | 6/2006 | Fadel | G06Q 10/00 705/26.62 |
| 7,171,106 | B2* | 1/2007 | Elberbaum | G08B 13/19634 348/143 |
| 7,685,206 | B1* | 3/2010 | Mathew et al. | 707/785 |
| 7,698,398 | B1* | 4/2010 | Lai | G06F 8/10 709/223 |
| 8,069,435 | B1* | 11/2011 | Lai | G06Q 10/10 717/106 |
| 8,447,829 | B1* | 5/2013 | Geller et al. | 709/217 |
| 8,504,991 | B2* | 8/2013 | Huang | G06F 17/30876 717/126 |
| 2004/0098609 | A1* | 5/2004 | Bracewell et al. | 713/200 |
| 2005/0246717 | A1* | 11/2005 | Poole | H04L 67/02 719/316 |
| 2006/0036573 | A1* | 2/2006 | Watanabe | H04L 67/34 |

* cited by examiner

*Primary Examiner* — Khanh Dinh
(74) *Attorney, Agent, or Firm* — James J. DeCarlo; Greenberg Traurig, LLP

(57) ABSTRACT

Disclosed herein are a resource control service, system, method and architecture. A client device's resource access is limited to an approved resource, or resources. A request for a resource is directed to a resource control service that determines whether or not to grant access to the requested resource. Where a determination is made to grant access to the resource, a response is transmitted to the client device, the response redirecting the client device to a second URI for the approved version of the requested resource. The response can be used by the client device request the resource from the location identified in the response.

30 Claims, 8 Drawing Sheets

THIRD PARTY PROGRAM INTEGRITY AND INTEGRATION CONTROL IN WEB-BASED APPLICATIONS

FIELD OF THE DISCLOSURE

The present disclosure is directed to integration of web resources, such as web applications provided by a third party, in a web site, and more particularly, to monitoring the web applications integrated in a web site and controlling access such that access via the web site is limited to approved web applications.

BACKGROUND

A web-based, or web, application is an application that is accessed over a network such as the Internet, or other network. The application may comprise program code, such as JavaScript or Adobe Flash code, which is executed by a computing device, e.g., a server computer, a user computer, etc., for example. A web site typically includes one or more web pages, each of which can include at least one web application, e.g., a link that results in the web application being executed on the server computer, the user computer or both. In some cases, a web application that is accessible via the web site's web page is provided by an entity, or third party, other than the web site entity, or party, providing the web site.

Since a web application can include powerful commands that can instruct the application to perform privileged operations on the web site and/or the user's computing device, the web site entity has an interest in ensuring that each web application that is accessible via the web site is trustworthy. Under the control of an untrustworthy web application, the web site and/or the user's computing device become vulnerable and the security of the web site and/or the user's computer device can be compromised by the web application's programming commands.

Security concerns can result in a web site entity avoiding partnering with third party web application providers, particularly third part web application providers having few resources to guarantee the trustworthiness of their web applications. A result being a web site entity forgoes including a web application with desirable functionality due to security concerns.

SUMMARY

The present disclosure seeks to address failings in the art and to provide monitoring and integration control of third party web applications. In accordance with one or more embodiments, the monitoring and integration control uses a redirect mechanism. The monitoring and integration control periodically fetches and analyzes a set of third party applications that a web site uses, e.g., has a dependency. The monitoring and integration control can recursively examine dependencies of each third party application in the set as well. If the monitoring and integration control detects changes in a third party application, e.g., a change in the execution or program flow of the application, it can be configured to alert a review by a system user, referred to herein as a reviewer, and/or an automated review component to review the web application in order to determine whether or not to approve the application. Where the application is not approved, the monitoring and integration control can deny access to the application.

In accordance with one or more embodiments, the monitoring and integration control involves most if not all of the requests for third party web applications made via the web site. By way of a non-limiting example, each request made for a third party web application made via the web site is directed to the monitoring and integration control, and where the request is for an approved application, the requester, e.g., a client application running on a user's computing device is redirected to the web application. In so doing, the monitoring and integration control determines whether to allow or block/deny access to each web application over which it has control.

In accordance with an aspect of the present disclosure, a method is provided comprising receiving a request for a resource from a client device, the request being directed to a resource control service using a first uniform resource identifier (URI) received with the request, the resource control service being provided by at least one server computer; performing, by the resource control service, at least one check of the requested resource to determine whether to grant access to the requested resource by the client device, the at least one check including determining whether an approved version of the requested resource is available for access by the client device; determining, by the resource control service, whether or not to grant access to the requested resource based on the at least one check; and where the resource control service makes a determination to grant access to the requested resource based on the at least one check, the resource control service causing a response to be transmitted to the client device, the response redirecting the client device to a second URI for the approved version of the requested resource.

In accordance with another aspect, a system is provided, which comprises at least one server computer comprising one or more processors to execute and memory to store instructions for a resource control service to receive a request for a resource from a client device, the request being directed to the resource control service using a first uniform resource identifier (URI) received with the request; perform at least one check of the requested resource to determine whether to grant access to the requested resource by the client device, the at least one check including determining whether an approved version of the requested resource is available for access by the client device; determine whether or not to grant access to the requested resource based on the at least one check; and where it makes a determination to grant access to the requested resource based on the at least one check, cause a response to be transmitted to the client device, the response redirecting the client device to a second URI for the approved version of the requested resource.

In accordance yet another aspect, a computer readable non-transitory storage medium is provided, the medium for tangibly storing thereon computer readable instructions that when executed cause at least one processor to provide a resource control service to receive a request for a resource from a client device, the request being directed to the resource control service using a first uniform resource identifier (URI) received with the request; perform at least one check of the requested resource to determine whether to grant access to the requested resource by the client device, the at least one check including determining whether an approved version of the requested resource is available for access by the client device; determine whether or not to grant access to the requested resource based on the at least one check; and where it makes a determination to grant access to the requested resource based on the at least one check, cause a response to be transmitted to the client device, the response redirecting the client device to a second URI for the approved version of the requested resource.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an exemplary overview of system components in accordance with one or more embodiments of the present disclosure.

FIG. 2 provides universal resource identifier (URI) examples and an example of a response for use in accordance with one or more embodiments of the present disclosure.

FIG. 3, which comprises FIGS. 3A and 3B, provides a process flow in accordance with one or more embodiments of the present disclosure.

FIG. 4, which comprises FIGS. 4A and 4B, provides a process flow in accordance with one or more embodiments of the present disclosure.

DETAILED DESCRIPTION

Figure 1:
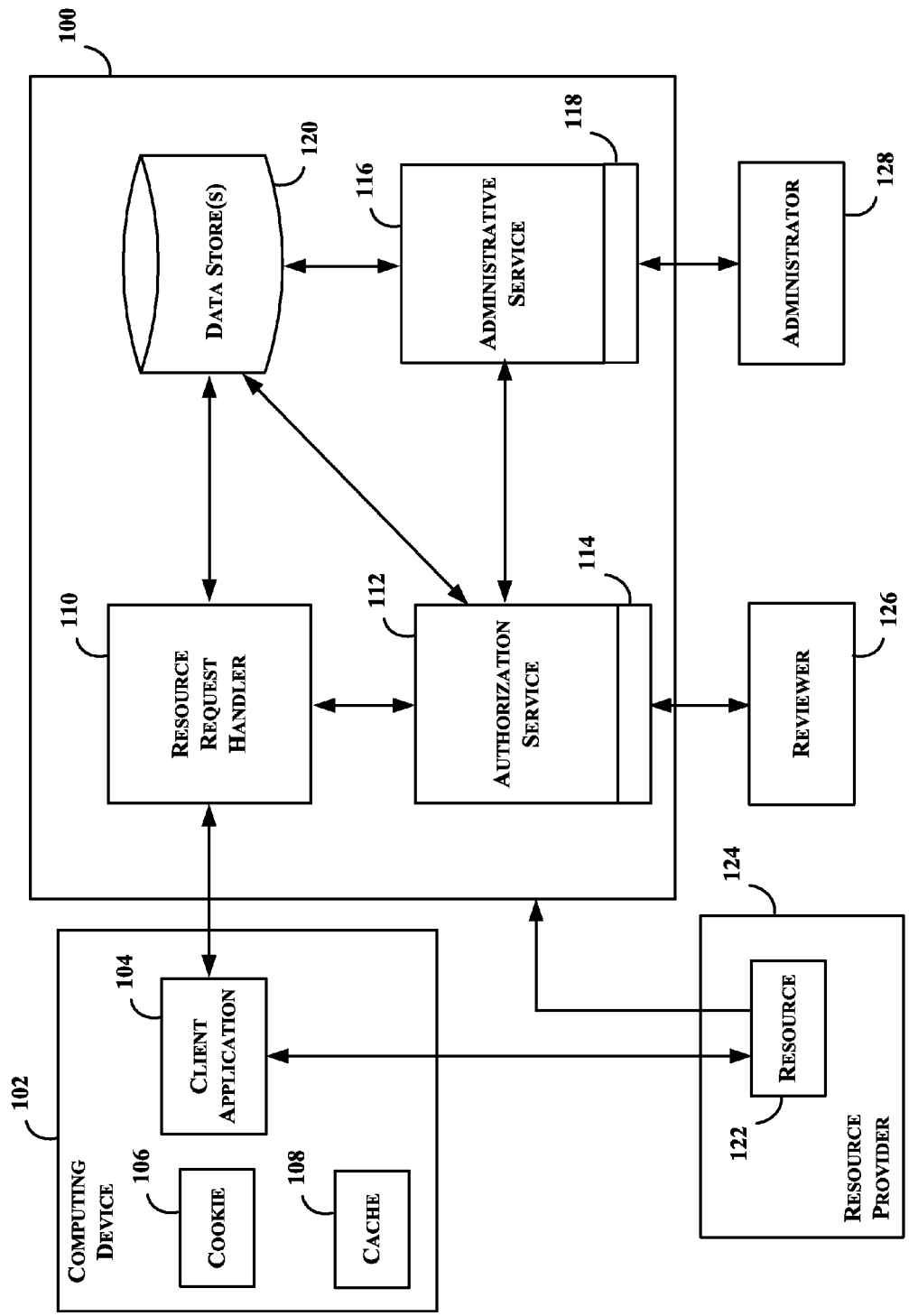

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

Generally, the present disclosure includes a resource monitoring and integration control service, system, method and architecture. In accordance with one or more embodiments, requests to access resources are monitored and controlled in order limit access to approved resources. A request for a resource is directed to resource monitoring and integration control, which determines whether or not to grant access to the requested resource. In accordance with one or more embodiments, the resource request is formed using the Hypertext Transport Protocol (HTTP), e.g., an HTTP GET request. Where a determination is made to grant access to the resource, a response is transmitted to the requesting device, a user's computing device, the response redirecting the requesting device to a second URI for the approved version of the requested resource. In accordance with one or more embodiments, the response redirecting the device to the requested resource uses the HTTP format and includes a "302 Found" status code and location of the requested resource. The response can be used by the requesting device to direct the resource request to the location identified in the response.

In accordance to one or more embodiments, the determination whether or not to grant access to the resource can be made using one or more integrity checks for the requested resource. One such integrity check that is made in accordance with one or more embodiments, is a check to ensure that the requested resource is approved for access by a requester. Approval of a resource can be based on whether or not the resource is performing a prohibited operation and/or will cause a prohibited operation to be performed, e.g., requested resource causes another resource to be accessed that includes a prohibited operation. By way of some non-limiting examples, a prohibited operation can be any suspect operation, such as a suspect browser cache access, a call to a suspect function, sending information retrieved from a user's device, e.g., browser cache and/or cookies, to a suspect location, and/or sending information retrieved from a server computer to a suspect location. In accordance with one or more embodiments, where a prohibited operation is identified with a resource, the resource's approval status can indicate that the resource is "not approved," and access to the resource can be denied based on the resource's approval status.

In accordance with one or more embodiments, a resource can be reviewed to determine whether or not to approve the resource for access. By way of some non-limiting examples, the review can be performed by a user, e.g., a system user, administrative user, etc., and/or by one or more automated analysis tools, e.g., static code analysis tool(s), to determine whether or not to approve access to the resource. The approval status can be determined prior to receipt of a request, so that where a request for the resource is received, an integrity check of the resource's approval status can include accessing a data store to retrieve a stored approval status of the resource. Alternatively, the review can be performed in response to a requests for the resource.

FIG. 1 provides an exemplary overview of system components in accordance with one or more embodiments of the present disclosure. System 100 receives a request from client application 104 for resource 122 provided by resource provider 124. In accordance with one or more embodiments, system 100 can be provided by a first entity, e.g., a web site provider, and resource provider can be a second entity different from the first entity. Alternatively, the first and second entity can be the same entity.

The request for resource 122 can be made by client application 104 executing on computing device 102, e.g., an end user's computing device. By way of a non-limiting example, the client application 104 can be a browser application displaying a web page of a web site provided by the first entity providing system 100. The web site provider can be hosting the resource 122 provided by the resource provider 124, and can be offering access to resource 122 via at least one web page that includes a first link, e.g., a first Universal Resource Identifier (URI), which is directed to resource request handler 110 of system 100. Where the resource 122 is approved by system 100, resource request handler 110 responds to the request with a second link, e.g., a second URI, which it transmits to client application 104. The client application 104 uses the second URI to access resource 122 from resource provider 124.

Where the resource request handler 110 receives the request for resource 122 from client application 104, the resource request handler 110 forwards the request to authorization service 112, which determines whether or not to grant access to the requested resource. In accordance with one or more embodiments, a resource can be approved by a reviewer 126 and/or a automated analysis tool (not shown). By way of a non-limiting example, reviewer 126 can be a system user that reviews the resource and determines whether or not to approve access to the resource 122 via a user interface 114. By way of a further non-limiting example, an automated analysis tool can include a static code analysis tool invoked by authorization service 112. An automated tool can be a part of system 100 or can be provided by an external source, e.g., a trusted source.

Data store 120 comprises information about the resource 122, such as by way of some non-limiting examples, the approval status, e.g., approved or not approved, of the resource 122; resource provider 124 identification information, such as the name or other identifier of resource provider 124; resource 122 identification information, e.g., resource name, digital signature and version number or other identifier identifying the latest version of the resource 122 approved by system 100; user authorization information to determine whether or not to authorize a user's access of the resource 122, such as identification of users authorized to access the resource 122 and/or a number of authorized user accesses in a time period, which information can be specified, for example, globally for all users, for a group of users or for each user individually.

The authorization service 112 uses information contained in the request to identify the resource 122 and access information about the resource 122 stored in data store 120. The authorization service 112 performs at least one check for the requested resource 122 to determine whether or not to grant access to the requested resource 122 by the client application 104. In accordance with one or more embodiments, the authorization service 112 determines whether an approved version of the requested resource 122 is available for access by the client application 104. The authorization service 112 retrieves the approval status of the resource 122 from the data store 120. Additionally, the authorization service 112 can retrieve information to determine whether the user is authorized to access the resource 122. In addition to the user authorization information stored in data store 120, the authorization service 122 can access the user's identification information, which can be retrieved from a cookie store 106 on the computing device 102 or included with the request, for example.

The authorization service 112 forwards its determination whether to grant or deny access to the requested resource 122 to resource request handler 110. Where the authorization service 112 makes a determination to grant access to the requested resource 122, the resource request handler 110 forwards the second URI to client application 104, which client application 104 can use to access the resource 122 from resource provider 124. Where the authorization service 112 makes a determination to deny access to the requested resource 122, resource request handler 110 can forward a message to client application 104 indicating that the access is not available for access. The message can notify the user to retry the request at a later time, to provide time for the system 100 to review the resource 122.

In accordance with one or more embodiments, authorization service comprises a user interface, which can be used by a reviewer 126 to view a resource, e.g., the resource requested by client application 104, and specify the approval status for the resource 122, e.g., approved or not approved. The approval status provided by the reviewer 126 via user interface 114 is forwarded by authorization service 112 to data store 120.

In accordance with one or more embodiments, administrative service 116 can comprise a user interface 118. Administrative service 116 can be accessed by administrator 128, e.g., a system user, via user interface 118 to configure system 100. By way of some non-limiting examples, administrator 128 can configure parameters specifying the type of error handling to be performed where a resource authorization fails and/or a resource request is denied, configure parameters specifying levels of logging, frequency of analyzing versions of resources from third party sources, local or remote hosting of third party programming content, etc. Configuration information entered by the administrator 128 can be stored in data store 120 by administrative service 116.

In accordance with one or more embodiments, system 100 can be configured such that authorization service 112 can alert reviewer 126 via user interface 114 where the request for the resource 122 by client application 104 was denied. The reviewer 126 can review the matter, e.g., review the reason for the denial and/or the resource 122, and determine whether or not to grant or deny the request and/or to update the approval status for the resource 122 via user interface 114. Authorization service 112 can forward any changes to the approval status for the resource 122 to data store 120 based on the reviewer's 126 input. Where the reviewer 126 makes a determination to grant the request by client application 104 to access resource 122, authorization service 112 can notify resource request handler 110.

As discussed herein, approval or non-approval of the resource 122 can be determined based on whether or not the resource 122 performs a prohibited operation and/or the resource 122 invokes another resource to perform a prohibited operation. Some non-limiting examples of operations that might be prohibited and result in non-approval of the resource 122 include prohibited references to document object model (DOM) objects, prohibited accesses to cookie store 106 and/or cache 108, e.g., cache of client application 104, references to programming code or other modules external to resource 122. In accordance with one or more embodiments, what constitutes a prohibited function can be specified as part of the configuration of system 100.

In the example shown in FIG. 100 includes resource request handler 110, authorization service 112 and administrative service 116 as separate components. It should be apparent that the components need not be separate, and that any one or more of the components can be combined into a single component, with the single component performing the functionality of the combined components. Furthermore, it should be apparent that one or more of the components can be broken into multiple components, with the functionality of the component being split by the multiple components.

Figure 2:
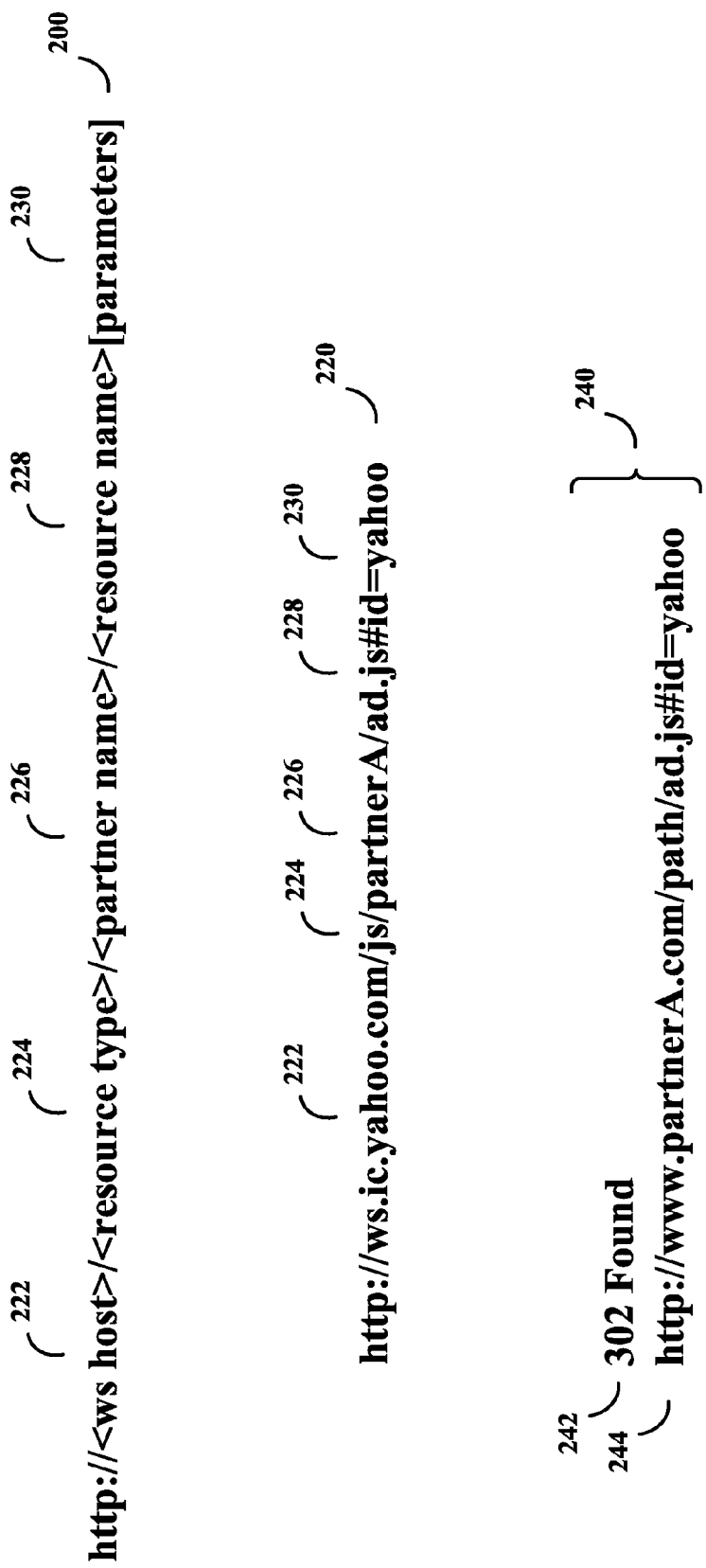

FIG. 2 provides universal resource identifier (URI) examples and an example of a response for use in accordance with one or more embodiments of the present disclosure. Syntax 200 provides an example of a format or syntax of a first URI. Syntax 200 comprises a field 222 that contains a reference to a first entity, e.g., a provider of system 100. Field 222 can be used to direct the request to resource request handler 110 of the first entity. In the example of FIG. 2, syntax 200 further comprises field 224 identifying a resource type of resource 122. By way of some non-limiting examples, field 224 can identify the resource as a JavaScript™, Adobe Flash™, etc. resource. Fields 226 and 228 contain information identifying the provider 124 of the resource 122 and information identifying the resource 122. Syntax 200 can optionally include one or more parameters 230, which can be parameters supplied by client application 104 for use with resource 122, for example.

URI 220 provides an example of the first URI using syntax 200. Field 222 contains a reference to direct the request to resource request handler 110. Field 224 identifies the resource 122 as being a JavaScript™ resource type. Field 226 identifies resource provider 124, and field 228 provides the name of the resource 122. Field 230 includes a parameter for use with the resource 122.

Response 240 is an example of information that is provided, in accordance with HTTP, by the request handler 110 in response to a request made by client application 104. The response 240 is made where system 100 makes a determination to grant the request by client application 104 to access to the resource 122. In accordance with one or more embodiments, the response 240 includes a status code, e.g., "302 Found" indicating that the resource 122 exists and instructing the client application 104 to use location information 244 to access resource 122. In accordance with one or more embodiments, location information 244 is a second URI that includes the domain, path and resource identification information of the resource 122, as well as the parameters 230. As discussed, where system 100 determines to deny access to the resource 122, request handler 110 can forward an error message in response to the request made by client application 104.

Figure 3A:
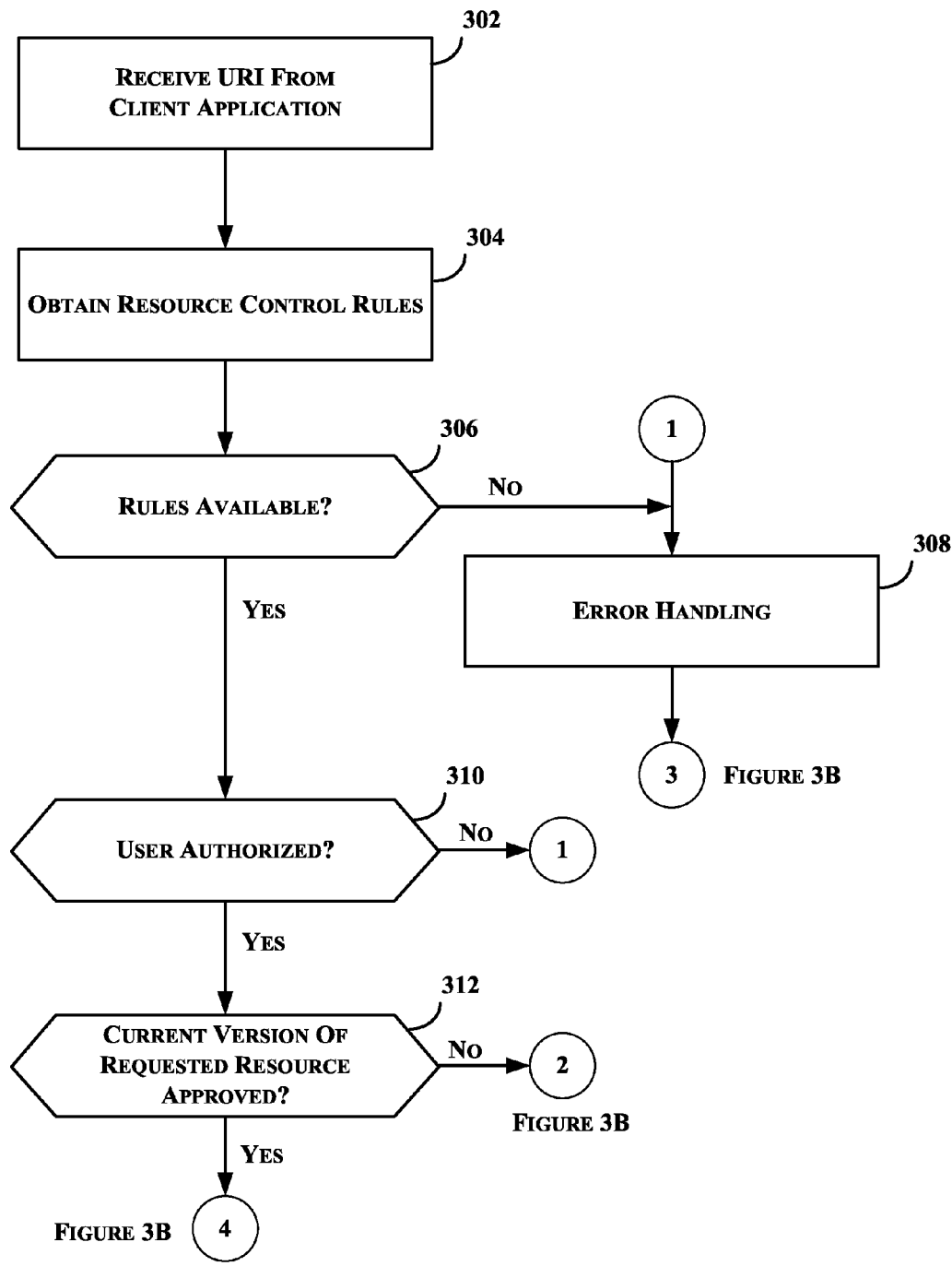
Figure 3B:
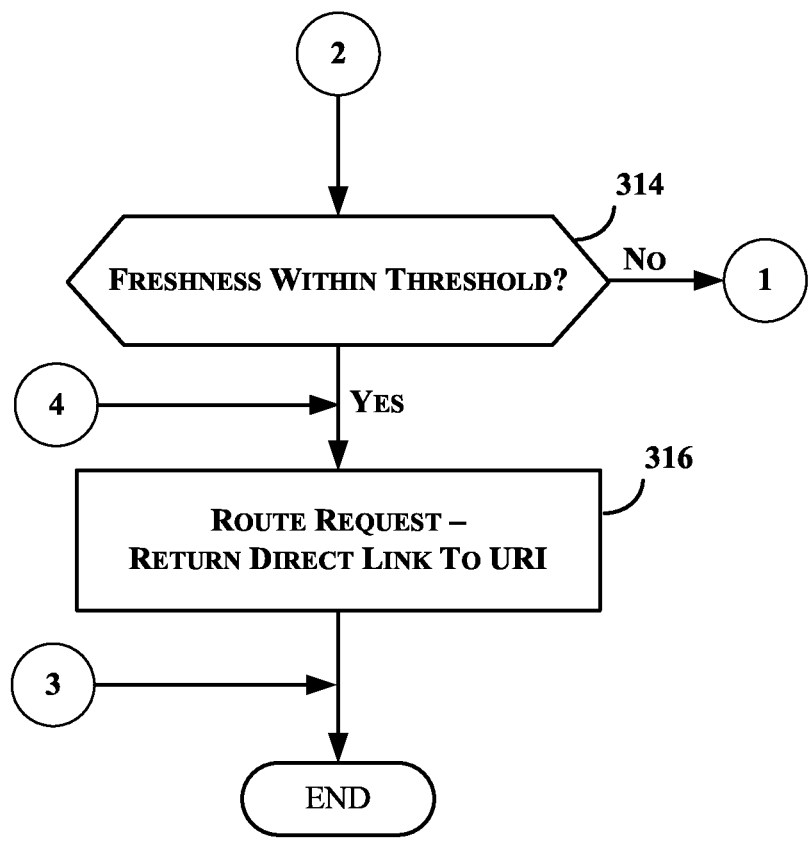

FIG. 3, which comprises FIGS. 3A and 3B, provides a process flow in accordance with one or more embodiments of the present disclosure. In accordance with one or more embodiments, the process flow is implemented by components of system 100. At step 302, the request for the resource 122 is received by the resource request handler 110. In accordance with one or more embodiments, the resource request handler 110 retrieves resource control rules, e.g., approval status, user authorization rules, etc., from data store 120 for use by authorization service 112 to determine whether or not to grant access to the requested resource 122 by client application 104. At step 306, a determination is made whether the control rules were available, e.g., from data store 120. If the control rules were not available, processing continues at step 308 to process the error. The error can result in a notification directed to reviewer 126 to provide the missing control rules for resource 122, and client application 104 can be notified, in a response to the request, that the resource 122 is not currently available for access.

If it is determined, at step 306, that the control rules were successfully retrieved, processing continues at step 310. At step 310, a determination is made whether or not the user is authorized to access the resource 122. By way of some non-limiting examples, authorization service 112 can determine whether the control rules retrieved from data store 120 identifies the user as an authorized user. If not, processing continues at step 308, so that the resource request handler 110 can notify the user, in response to the request, that the user is not authorized to access the requested resource 122. In addition, where a control rule identifies that the user is limited to a threshold number of accesses in a period of time, authorization service 112 can determine, at step 310, whether the number of times that the user has accessed the resource 122 exceeds the threshold. If so, processing continues at step 308 to process the error, e.g., to respond to the request for the resource 122 by notifying the user that the user has exceeded the threshold number of accesses. If it is determined, at step 310, that the user is authorized to access the requested resource 122, processing continues at step 312.

At step 312, the authorization service 112, determines whether or not the requested resource 122 is approved for access. By way of a non-limiting example, the authorization service 112 checks the approval status of the resource 122 to determine whether or not the current version of the resource 122 is approved for access. Where the approval status of the resource 122 indicates an approval to access the resource 122, system 100 can determine whether or not the current version of the resource 122 retrievable from provider 124 is the same version as the approved version of the resource 122. System 100 can use the second URI stored in the data store 120 to retrieve the resource 122 from resource provider 124 and generate a signature, e.g., using a hash or other function, using the contents of the resource 122 retrieved from provider 124. The generated signature can be compared with a signature stored in data store 120. The stored signature can be a signature generated from the version of resource 122 approved by system 100. Where the generated and stored signatures are compared and determined to be a match, system 100 determines that the resource 122 from provider 124 is the approved version of the resource 122. Processing continues at step 316, whereby resource request handler 110 returns a response, e.g., response 240, directing the client application 104 to access the resource 122 via the resource provider 124.

In accordance with one or more embodiments, the system 100 can give a resource provider 124 a grace period, such that during the grace period 124 the resource 122 is available for access without approval of the resource 122 by system 100. The grace period might be available to a trusted third party, for example. A threshold period of freshness can be twelve hours, for example, in which a new resource 122 is available for access without prior approval by system 100. Where no grace period is to be provided, the grace period can be expressed as a null period and/or as being expired, for example. Reviewer 126 and/or administrator 128 can specify the grace period for a given provider 124 and/or resource 122. The grace period may begin when the resource 122 is included in a web site of the first provider, for example. Alternatively, the resource provider 122 can provide notification to system 122 that it wishes to provide a new resource or a new version of the resource, and the grace period can begin at some point after the notification. As yet another alternative, the reviewer 126 and/or administrator 128 can identify the start and end times of the grace period.

If it is determined at step 312, that the current version of the resource 122 is not approved, processing continues at step 314 to determine whether or not the grace period for the resource 122 has expired, e.g., the "freshness" of the resource 122 exceeds the threshold grace period specified for the resource 122. If the freshness of the resource 122 exceeds the threshold amount of time, processing continues at step 308 to process the error, e.g., the resource request handler 110 can notify client application 104 that the requested resource 122 is not currently available for access and/or alert the reviewer 126 and/or administrator 128.

If it is determined, at step 314, that the freshness of the resource 122 is within the specified threshold, processing continues at step 316 to return the second URI and direct the client application 104 to use the second URI to access the requested resource 122.

Figure 4A:
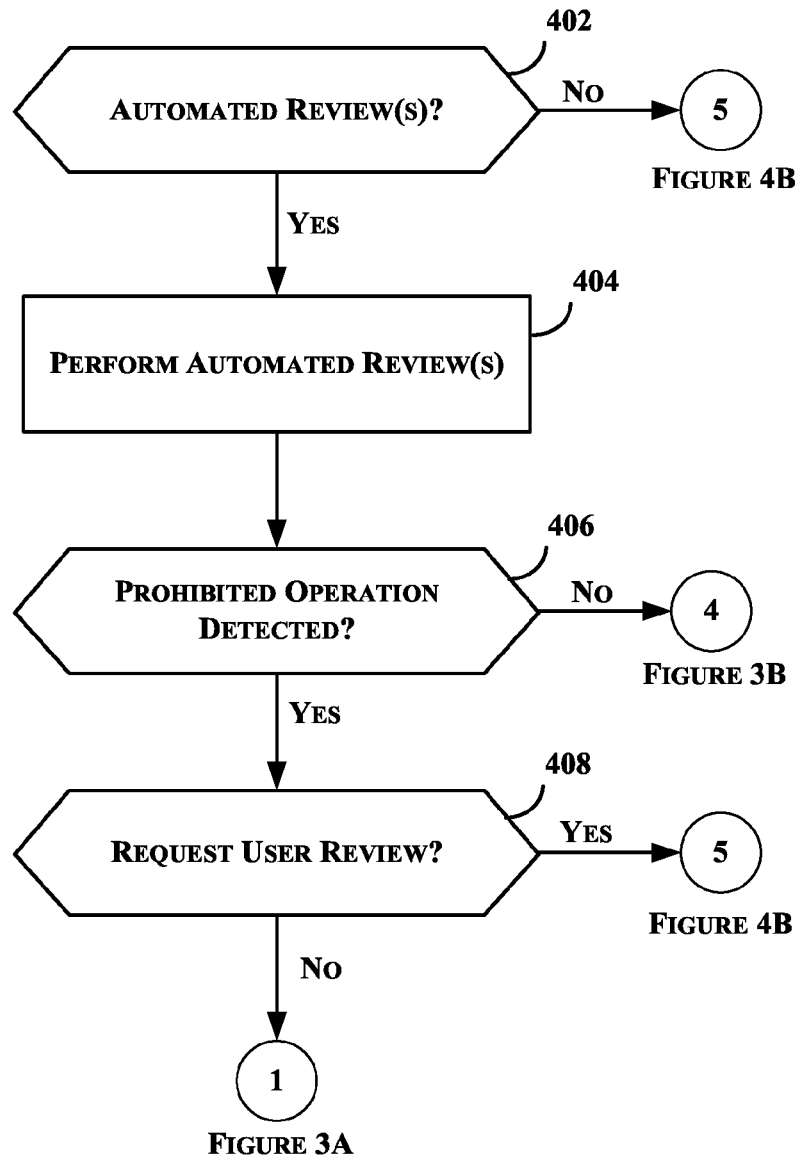
Figure 4B:
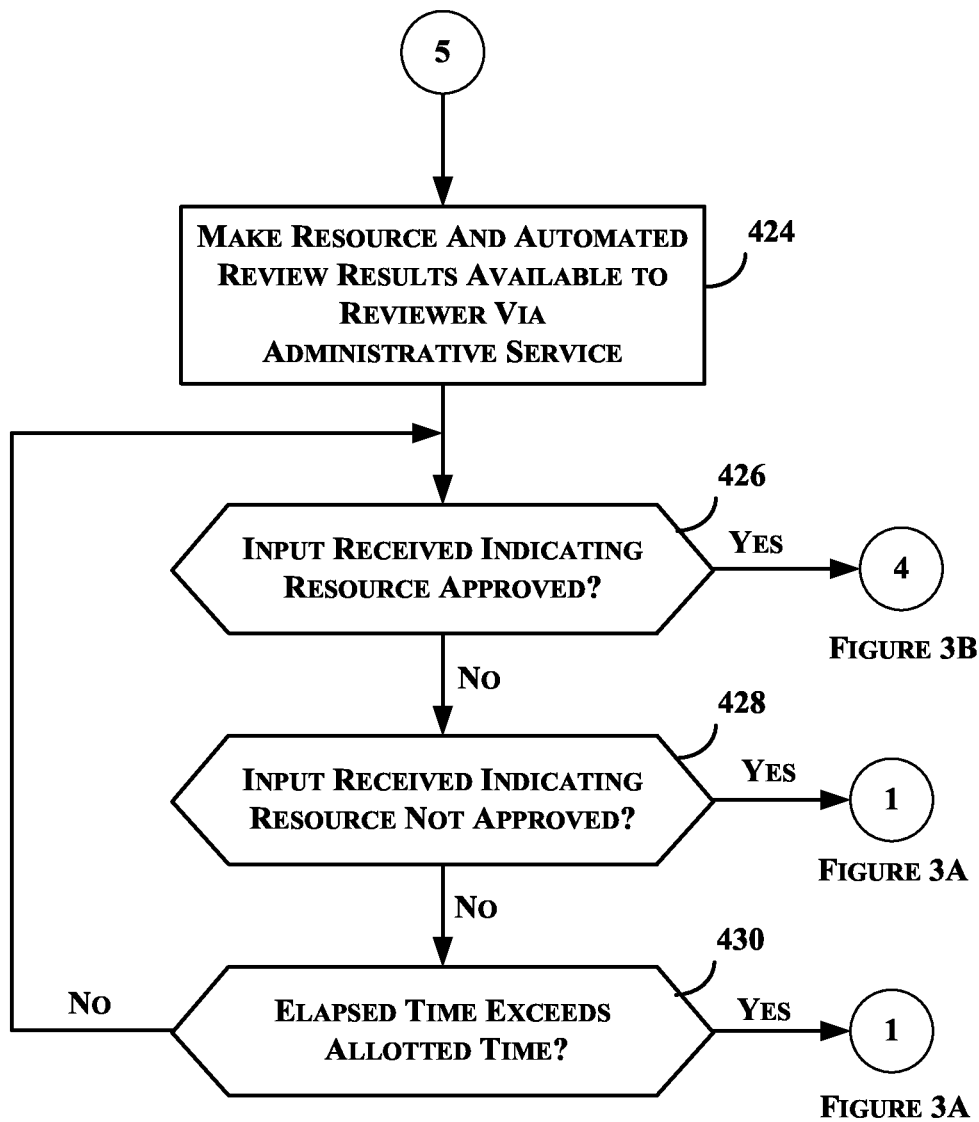

FIG. 4, which comprises FIGS. 4A and 4B, provides a process flow in accordance with one or more embodiments of the present disclosure. As discussed herein, a review of resource 122 can be performed by a reviewer 126 and/or an automated analysis tool, such as a static code analysis tool. Configuration information specified by an administrator 128, for example, can be used to determine whether an automated review is to be performed, as well as what automated review is to be performed, and/or whether or not a reviewer 126 is to perform a review of the resource 122.

At step 402, the configuration information is used to determine whether or not to perform an automated review of resource 122. If at least one automated review is to be performed, processing continues at step 404 to perform the automated review(s). At step 406 a determination is made whether or not an automated review identified a suspect or prohibited operation in connection with the resource 122. In accordance with one or more embodiments, where the resource 122 accesses another resource, the review can be performed recursively, such that each resource that would be accessed can be reviewed.

If it is determined, at step 406, that a prohibited or suspect operation is not detected, processing continues at step 316 of FIG. 3B to return the second URI to client application 104. In this example, it is assumed that system 100 is configured to use automated analysis tools and not a reviewer 126 to detect a prohibited or suspect operation in connection with the resource 122. Alternatively, where system 100 is configured to use reviewer 126 to detect a prohibited or suspect operation, processing can continue to step 424 to make the resource 122 and the results of the analysis conducted by the automated analysis tool(s) available to the reviewer 126, e.g., via authorization service 112 and user interface 114.

In the example of FIG. 4, the system 100 can be configured to request that a reviewer 126 conduct a review of the resource where a prohibited/suspect operation is detected by an automated review(s) conducted by one or more automated analysis tools. If it is determined, at step 406, that the automated review(s) detected a prohibited operation, processing continues at step 408 to determine, based on the configuration, whether or not to request that the reviewer 126 perform a review of the resource 122. Where the configuration information specifies that a review is not be conducted by a reviewer 126, the authorization service 112 can store an approval status indicating that the resource 122 is not approved in data store 120. Where there is a request from client 114 for the resource 122, the authorization service 112 can notify resource request handler 110 to respond to the request indicating that the resource 122 is not available for access.

If it is determined, at step 408, that the resource 122 is to be reviewed by reviewer 124, processing continues at step 424 to make the resource 122 and the results of the automated review(s) available to the reviewer 124 via user interface 114 of authorization service 112. At step 426, a determination is made whether or not the reviewer 124 has provided input indicating that the resource 122 is approved. If so, data store 120 is updated, and where there is a request for the resource 122 from client application 104, processing continues at step 316 of FIG. 3B, to make the resource 122 available to the client application 104. If it is determined, at step 426 that input indicating approval of the resource 122 has not been received, processing continues at step 428 to determine whether or not the reviewer 126 has indicated that the resource 122 is not approved. If so, data store 120 is updated, and processing continues at step 308 to process the error. If it is determined that input has not yet been received from the reviewer 126, processing continues at step 430 to determine whether a period of time, e.g., a period of time for review, grace period, and/or for response to the request by client application 104, has expired. If so, where there is a request for the resource 122, processing continues at step 308 of FIG. 3A to notify the client application 104 that the resource 122 is not currently available. Where the reviewer 124 provides an approval status for the resource 122, even where the submission occurs after the time period for response to the request, the approval status is stored in data store 120. If it is determined, at step 430, that the time period for response has not expired, processing can continue at step 426 to determine whether the reviewer 124 has submitted input for the approval status of the resource 122.

Figure 5:
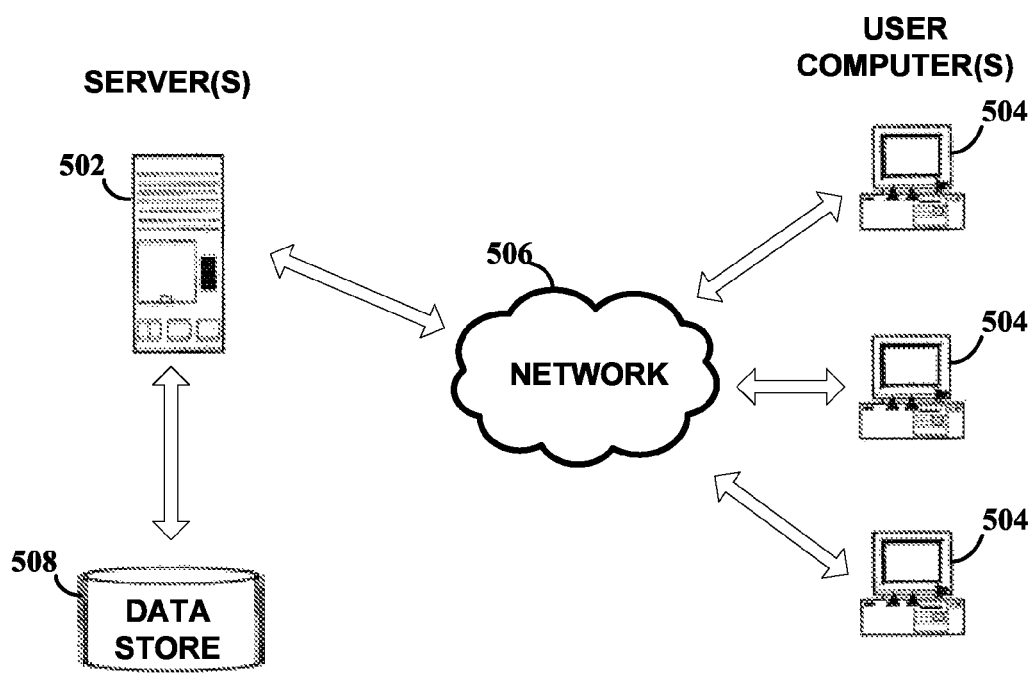
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers, computing devices 102 or other computing device, are configured to comprise functionality described herein. For example, a computing device 502 can be configured to execute program code, instructions, etc. to provide functionality in accordance with one or more embodiments of the present disclosure. The same or another computing device 502 can be configured to provide system 100.

Computing device 502 can serve content to user computing devices 504, e.g., computing devices 102, using a browser application via a network 506. Data store 508, which can include data store 120, can be used to store data as described herein, as well as program code to configure a server 502 to execute functionality, such as that described herein in connection with system 100.

The user computing device 504, and/or user device 102, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
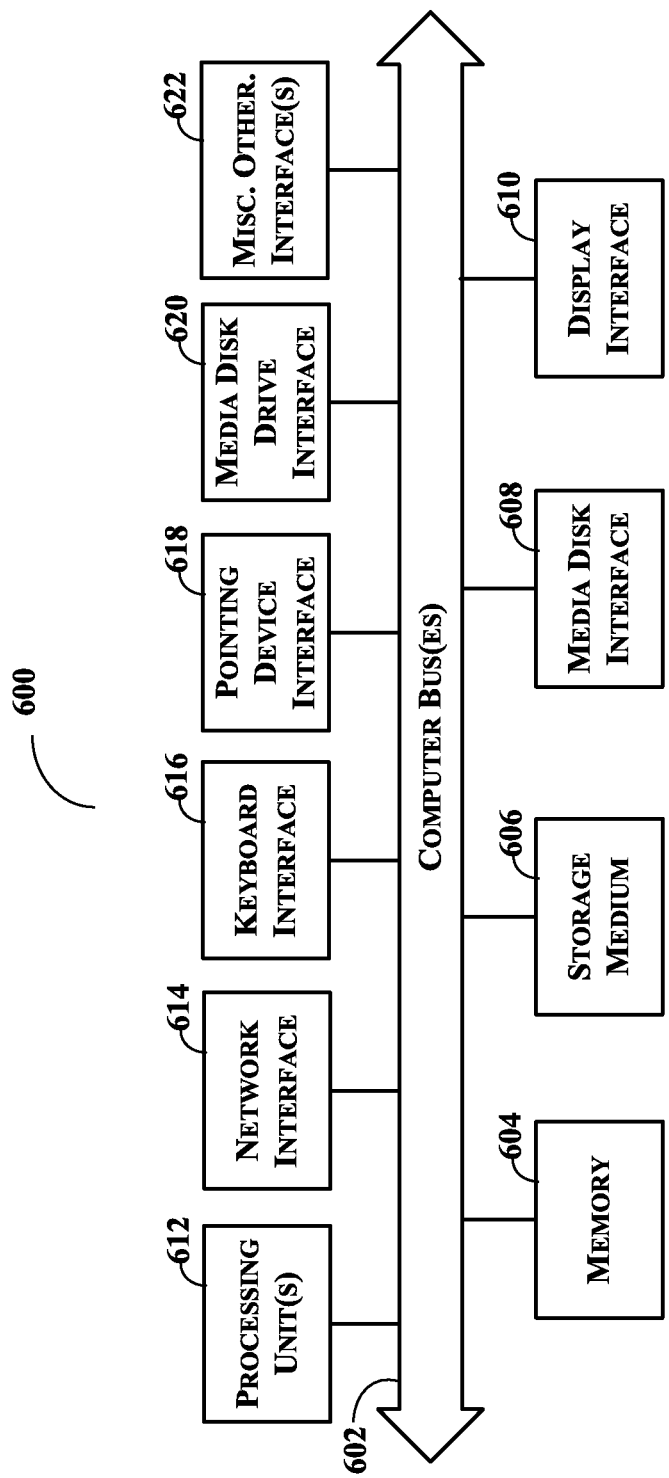
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
receiving, at a server computer executing a resource control service, a request to access a resource from a client device, the request being directed to the resource control service using a first uniform resource identifier (URI) received with the request;
in response to the resource control service receiving the request of the client device to access the requested resource, the resource control service implementing actions comprising:
  performing at least one check of the requested resource to determine whether to grant access to the requested resource by the client device, the at least one check including determining whether an approved-version of the requested resource is available;
  determining whether or not to grant access to the requested resource based on the at least one check including determining whether an approved version of the requested resource is available; and where the resource control service makes a determination to grant access to the requested resource based on the at least one check, the resource control service causing a response to the received request to access the requested resource to be transmitted to the client device, the response redirecting the client device to a second URI for the approved version of the requested resource.

2. The method of claim 1, determining whether an approved version of the requested resource is available further comprising:
obtaining the requested resource using the second URI;
generating a signature from the obtained resource;
obtaining a stored signature for the requested resource;
comparing the generated signature and the stored signature to determine whether there is a match;
where it is determined that there is a match, the resource control service makes a determination to grant access to the requested resource using the second URI.

3. The method of claim 2, further comprising:
where it is determined that there is not a match, the resource control service:
alerting a reviewer to review the requested resource; and
denying the client device's access to the requested resource unless the reviewer approves the obtained resource.

4. The method of claim 2, further comprising:
where it is determined that there is not a match, the resource control service:
analyzing the obtained resource to determine whether the obtained resource includes a prohibited operation;
where it is determined that the obtained resource does not include a prohibited operation, the resource control service:
identifying the obtained resource as the approved version of the requested resource; and
making a determination to grant access to the requested resource.

5. The method of claim 4, further comprising:
where it is determined that that the obtained resource includes a prohibited operation, the resource control service:
alerting a reviewer to review the requested resource; and
denying the client device's access to the requested resource unless the reviewer approves the requested resource.

6. The method of claim 4, the analyzing further comprising:
identifying at least one analysis to be performed on the obtained resource based on a resource type associated with the requested resource; and
performing the at least one analysis on the obtained resource to determine whether the obtained resource includes a prohibited operation.

7. The method of claim 1, wherein the resource control service is provided by a first entity and the resource is provided by a second entity different from the first entity.

8. The method of claim 7, wherein the first URI is contained in a web page provided by the first entity.

9. The method of claim 1, further comprising:
determining whether the user is authorized to access the requested resource using information that is associated with the request and identifies the user;
the determining, by the resource control service, whether or not to grant access to the requested resource being further based on whether the user is authorized to access the requested resource, the method further comprising:
where it is determined that the user is authorized to access the requested resource and an approved version of the requested resource is available, making a determination to grant access to the requested resource; and
where it is determined that the user is not authorized to access the requested resource, making a determination to deny access to the requested resource.

10. The method of claim 1, further comprising:
determining whether a number of times the user has accessed the resource in the time period exceeds a threshold number of times that the user is authorized to access the requested resource;
the determining, by the resource control service, whether or not to grant access to the requested resource being further based on the determining whether the user is authorized to access the requested resource, the method further comprising:
where it is determined that the number of times the user has accessed the resource in the time period does not exceed the threshold number of times that the user is authorized to access the requested resource and an approved version of the requested resource is available, making a determination to grant access to the requested resource; and
where it is determined that the number of times the user has accessed the resource in the time period exceeds the threshold number of times that the user is authorized to access the requested resource, making a determination to deny access to the requested resource.

11. A system comprising:
a server computer comprising one or more processors and a storage medium for tangibly storing thereon program logic for execution by the one or more processors, the stored program logic comprising:
receiving logic executed by the one or more processors for receiving a request to access a resource from a client device, the request being directed to a resource control service using a first uniform resource identifier (URI) received with the request;
the stored program logic further comprising resource control service logic executed by the one or more processors in response to the request to access the requested resource comprising:
performing logic executed by the one or more processors for performing, in response to the received request to access the requested resource, at least one check of the requested resource to determine whether to grant access to the requested resource by the client device, the at least one check including determining, whether an approved version of the requested resource is available;
determining logic executed by the one or more processors for determining whether or not to grant access to the requested resource based on the at least one check including determining whether an approved version of the requested resource is available; and
where a determination is made to grant access to the requested resource based on the at least one check, the stored program logic further comprising causing logic executed by the one or more processors for causing a response to the received request to access the requested resource to be transmitted to the client device, the response redirecting the client device to a second URI for the approved version of the requested resource.

12. The system of claim 11, the program logic for determining whether an approved version of the requested resource is available further comprising:
  obtaining logic executed by the one or more processors for obtaining the requested resource using the second URI;
  generating logic executed by the one or more processors for generating a signature from the obtained resource;
  obtaining logic executed by the one or more processors for obtaining a stored signature for the requested resource;
  comparing logic executed by the one or more processors for comparing the generated signature and the stored signature to determine whether there is a match;
  making logic executed by the one or more processors for making, where it is determined that there is a match, a determination to grant access to the requested resource using the second URI.

13. The system of claim 12, the stored program logic:
  where it is determined that there is not a match:
    alerting logic executed by the one or more processors for alerting a reviewer to review the requested resource; and
    denying logic executed by the one or more processors for denying the client device's access to the requested resource unless the reviewer approves the obtained resource.

14. The system of claim 12, the stored program logic further comprising:
  where it is determined that there is not a match:
    analyzing logic executed by the one or more processors for analyzing the obtained resource to determine whether the obtained resource includes a prohibited operation;
    where it is determined that the obtained resource does not include a prohibited operation:
      identifying logic executed by the one or more processors for identifying the obtained resource as the approved version of the requested resource; and
      making logic executed by the one or more processors for making a determination to grant access to the requested resource.

15. The system of claim 14, the stored program code further comprising:
  where it is determined that that the obtained resource includes a prohibited operation:
    alerting logic executed by the one or more processors for alerting a reviewer to review the requested resource; and
    denying logic executed by the one or more processors for denying the client device's access to the requested resource unless the reviewer approves the requested resource.

16. The system of claim 14, the analyzing logic further comprising:
  identifying logic executed by the one or more processors for identifying at least one analysis to be performed on the obtained resource based on a resource type associated with the requested resource; and
  performing logic executed by the one or more processors for performing the at least one analysis on the obtained resource to determine whether the obtained resource includes a prohibited operation.

17. The system of claim 11, wherein the resource control service is provided by a first entity and the resource is provided by a second entity different from the first entity.

18. The system of claim 17, wherein the first URI is contained in a web page provided by the first entity.

19. The system of claim 11, the stored program logic further comprising:
  determining logic executed by the one or more processors for determining whether the user is authorized to access the requested resource using information that is associated with the request and identifies the user;
  the determining logic executed by the one or more processors for determining whether or not to grant access to the requested resource being further based on whether the user is authorized to access the requested resource, the stored program logic further comprising:
    where it is determined that the user is authorized to access the requested resource and an approved version of the requested resource is available, making logic executed by the one or more processors for making a determination to grant access to the requested resource; and
    where it is determined that the user is not authorized to access the requested resource, making logic executed by the one or more processors for making a determination to deny access to the requested resource.

20. The system of claim 11, the stored program logic further comprising:
  determining logic executed by the one or more processors for determining whether a number of times the user has accessed the resource in the time period exceeds a threshold number of times that the user is authorized to access the requested resource;
  the determining logic executed by the one or more processors for determining whether or not to grant access to the requested resource being further based on whether the user is authorized to access the requested resource, the stored program logic further comprising:
    where it is determined that the number of times the user has accessed the resource in the time period does not exceed the threshold number of times that the user is authorized to access the requested resource and an approved version of the requested resource is available, making logic executed by the one or more processors for making a determination to grant access to the requested resource; and
    where it is determined that the number of times the user has accessed the resource in the time period exceeds the threshold number of times that the user is authorized to access the requested resource, making logic executed by the one or more processors for making a determination to deny access to the requested resource.

21. A computer readable non-transitory storage medium for tangibly storing thereon computer readable instructions that when executed cause at least one processor to:
  provide a resource control service at a server computer to:
    receive a request to access a resource from a client device, the request being directed to the resource control service using a first uniform resource identifier (URI) received with the request;
    in response to the resource request service receiving the request of the client device to access the requested resource received, the resource control service implementing actions comprising:

performing at least one check of the requested resource to determine whether to grant access to the requested resource by the client device, the at least one check including determining, whether an approved version of the requested resource is available;

determining whether or not to grant access to the requested resource based on the at least one check including determining whether an approved version of the requested resource is available; and where it makes a determination to grant access to the requested resource based on the at least one check causing a response to the received request to access the requested resource to be transmitted to the client device, the response redirecting the client device to a second URI for the approved version of the requested resource.

22. The medium of claim 21, the instructions to provide a resource control service to determine whether an approved version of the requested resource is available further comprising instructions to provide a resource control service to:
obtain the requested resource using the second URI;
generate a signature from the obtained resource;
obtain a stored signature for the requested resource;
compare the generated signature and the stored signature to determine whether there is a match;
where it is determined that there is a match, make a determination to grant access to the requested resource using the second URI.

23. The medium of claim 22, instructions to provide a resource control service further comprising instructions to provide a resource control service to:
where it is determined that there is not a match:
alert a reviewer to review the requested resource; and
deny the client device's access to the requested resource unless the reviewer approves the obtained resource.

24. The medium of claim 22, instructions to provide a resource control service further comprising instructions to provide a resource control service to:
where it is determined that there is not a match:
analyze the obtained resource to determine whether the obtained resource includes a prohibited operation;
where it is determined that the obtained resource does not include a prohibited operation:
identify the obtained resource as the approved version of the requested resource; and
make a determination to grant access to the requested resource.

25. The medium of claim 24, instructions to provide a resource control service further comprising instructions to provide a resource control service to:
where it is determined that that the obtained resource includes a prohibited operation:
alert a reviewer to review the requested resource; and
deny the client device's access to the requested resource unless the reviewer approves the requested resource.

26. The medium of claim 24, the instructions to provide a resource control service to analyze further comprising instructions to provide a resource control service to:
identify at least one analysis to be performed on the obtained resource based on a resource type associated with the requested resource; and
perform the at least one analysis on the obtained resource to determine whether the obtained resource includes a prohibited operation.

27. The medium of claim 21, wherein the resource control service is provided by a first entity and the resource is provided by a second entity different from the first entity.

28. The medium of claim 27, wherein the first URI is contained in a web page provided by the first entity.

29. The medium of claim 21, the instructions to provide a resource control service further comprising instructions to provide a resource control service to:
determine whether the user is authorized to access the requested resource using information that is associated with the request and identifies the user;
the instructions to provide a resource control service to determine whether or not to grant access to the requested resource being further based on whether the user is authorized to access the requested resource, the instructions further comprising instructions to:
where it is determined that the user is authorized to access the requested resource and an approved version of the requested resource is available, make a determination to grant access to the requested resource; and
where it is determined that the user is not authorized to access the requested resource, make a determination to deny access to the requested resource.

30. The medium of claim 21, the instructions to provide a resource control service further comprising instructions to provide a resource control service to:
determine whether a number of times the user has accessed the resource in the time period exceeds a threshold number of times that the user is authorized to access the requested resource;
the instructions to provide a resource control service to determine whether or not to grant access to the requested resource being further based on whether the user is authorized to access the requested resource, the instructions further comprising instructions to:
where it is determined that the number of times the user has accessed the resource in the time period does not exceed the threshold number of times that the user is authorized to access the requested resource and an approved version of the requested resource is available, make a determination to grant access to the requested resource; and
where it is determined that the number of times the user has accessed the resource in the time period exceeds the threshold number of times that the user is authorized to access the requested resource, make a determination to deny access to the requested resource.

* * * * *